(12) United States Patent
Sutton

(10) Patent No.: US 6,378,642 B1
(45) Date of Patent: Apr. 30, 2002

(54) MOTORIZED SCOOTER

(75) Inventor: Eugene R. Sutton, Lehigh Acres, FL (US)

(73) Assignee: Eugene R Sutton, Lehigh Acres, FL (US)

( * ) Notice: Subject to any disclaimer, the term of this patent is extended or adjusted under 35 U.S.C. 154(b) by 0 days.

(21) Appl. No.: 09/793,812

(22) Filed: Feb. 26, 2001

(51) Int. Cl.[7] .................. B62D 51/02; B62D 61/08; B62M 7/12; B62M 11/16
(52) U.S. Cl. ............... 180/208; 180/214; 180/65.5
(58) Field of Search .................. 180/214, 213, 180/211, 212, 210, 208, 65.5, 65.6, 13, 16

(56) References Cited

U.S. PATENT DOCUMENTS

| | | | | |
|---|---|---|---|---|
| 3,099,326 A | * | 7/1963 | Weigel et al. | 180/214 |
| 3,603,609 A | * | 9/1971 | Hott et al. | 180/210 |
| 3,659,871 A | * | 5/1972 | Hott | 280/221 |
| 3,704,759 A | * | 12/1972 | Vitkov et al. | 180/65.5 |
| 4,570,739 A | * | 2/1986 | Kramer | 180/208 |
| 4,750,578 A | * | 6/1988 | Brandenfels | 180/214 |
| 4,944,360 A | * | 7/1990 | Sturges | 180/208 |
| 6,100,615 A | * | 8/2000 | Birkestrand | 180/65.5 |
| 6,199,652 B1 | * | 3/2001 | Mastroianni et al. | 180/65.5 |

FOREIGN PATENT DOCUMENTS

WO        93/01788    *  2/1993

\* cited by examiner

Primary Examiner—Peter C. English

(57) ABSTRACT

A three wheeled electrically driven scooter having a front wheel drive. The scooter consists of three main components including a steering column having a front wheel attached at its bottom, a platform assembly and a seat assembly having a seat thereon. The front wheel drive includes a planetary speed reducing gear. The steering column is movably attached to the platform in such a manner so that the steering column can be adjusted in various positions relative to a vertical line and relative to the platform assembly. The seat assembly is mounted on the platform assembly so that the seat assembly can swing from a position where a person can sit on the seat on the seat assembly to an inactive position enabling the person to stand on a platform of the platform assembly.

8 Claims, 5 Drawing Sheets

MOTORIZED SCOOTER

CROSS REFERENCE TO RELATED APPLICATIONS none

STATEMENT REGARDING FED SPONSORED R & D none

REFERENCE TO MICROFICHE APPENDIX none

BACKGROUND OF THE INVENTION

The invention pertains to a motorized three-wheeled scooter for use by adults as well as teen-agers that are limited in their bodily movement. The limited movement is either caused by an accident or through a birth defect. The scooter is also designed and constructed for when a person's disability is such that the person can stand for awhile but then easily fatigues and must sit down. This scooter can accommodate both of these instances. The scooter of the invention also shows its versatility when operating the same in a crowded environment where the operation of a motorized scooter can be dangerous because a person sitting down has limited view or visibility. With the motorized scooter of the invention a person operating in this crowded environment has a choice of either standing up or sitting down when operating the scooter. When standing up, the person has an excellent view over the crowd because of the platform on the scooter, on which the person is standing. The person, when standing up has a steady support by simply grasping the handle bars of the steering column of the scooter. The person is somewhat elevated above the crowd and can therefore plot the way to go. This versatility from standup to sit-down can be accomplished within seconds without any tools or other major operations. The scooter itself consists of only three major components which can easily be disassembled and stored in the trunk or the back seat of a car. Scooters are known in the prior art either from patents or from sales brochures.

U.S. Des. Pat. No. 430,063 shows a three-wheeled electric scooter apparently having a front wheel drive. The structure of the front wheel drive cannot be gleaned from the drawings and/or description. The illustrated scooter has a standup platform only.

U.S. Des. Pat. No. 414,220 illustrates a three-wheeled scooter that also has a standup platform only. The scooter appears to be driven by the rear wheels.

U.S. Des. Pat. No. 428,365 illustrates a three wheeled scooter. It is not clear if there is a power drive and where. The seat assembly cannot be adapted to move from an active position to an inactive position.

U.S. Pat. No. 5,620,189 shows a scooter that is not motorized. It is not three-wheeled and has a very large front wheel.

U.S. Pat. No. 5,950,755 discloses a three wheeled scooter having a rear wheel drive. The seat cannot swing from an active position where a person can sit on a seat to an inactive position where the person can assume a standing position. This is a disadvantage in that the scooter dimensions have to be increased considerably especially in its length which will impact on its maneuverability.

U.S. Pat. No. 6,176,337 shows a three wheeled scooter having a rear wheel drive and the seat is not described as being swingable from an active position where a person can sit on the seat to an inactive position where a person can stand on the platform of the scooter. The sales brochure by "Lifestyle Mobility Aids" illustrates a three-wheeled scooter "Minitraveler™" having a rear wheel drive including a seat. It is not designed and constructed to be used as a sitdown or a standup scooter.

The sales brochure by "Lark of America" shows a three-wheeled scooter under the name of "Lark 3". The scooter shown has a rear wheel drive and a sitdown chair. It is believed that both scooters shown in the above brochures cannot be used for any standup operation unless the seats are removed altogether first.

SUMMARY AND OBJECTS OF THE INVENTION

One of the objects of the invention is to construct and to present a three-wheeled scooter that is very versatile in that it can be used alternately in a standup or sitdown mode without requiring any tools or major operations such as assembly or disassembly. This is simply accomplished by manually moving the chair from a use to a non-use position on the scooter. Another object is to provide a front wheel drive which is very sure-footed by using a gear drive. Another object is to design a steering column or driving tiller which is adjustable in height and into various vertical positions. The scooter consists of three components which can easily be disassembled and again assembled without the use of any tools which components can easily be stored in the trunk or the back seat of a car.

DETAILED DESCRIPTION OF THE INVENTION

Figure 1:
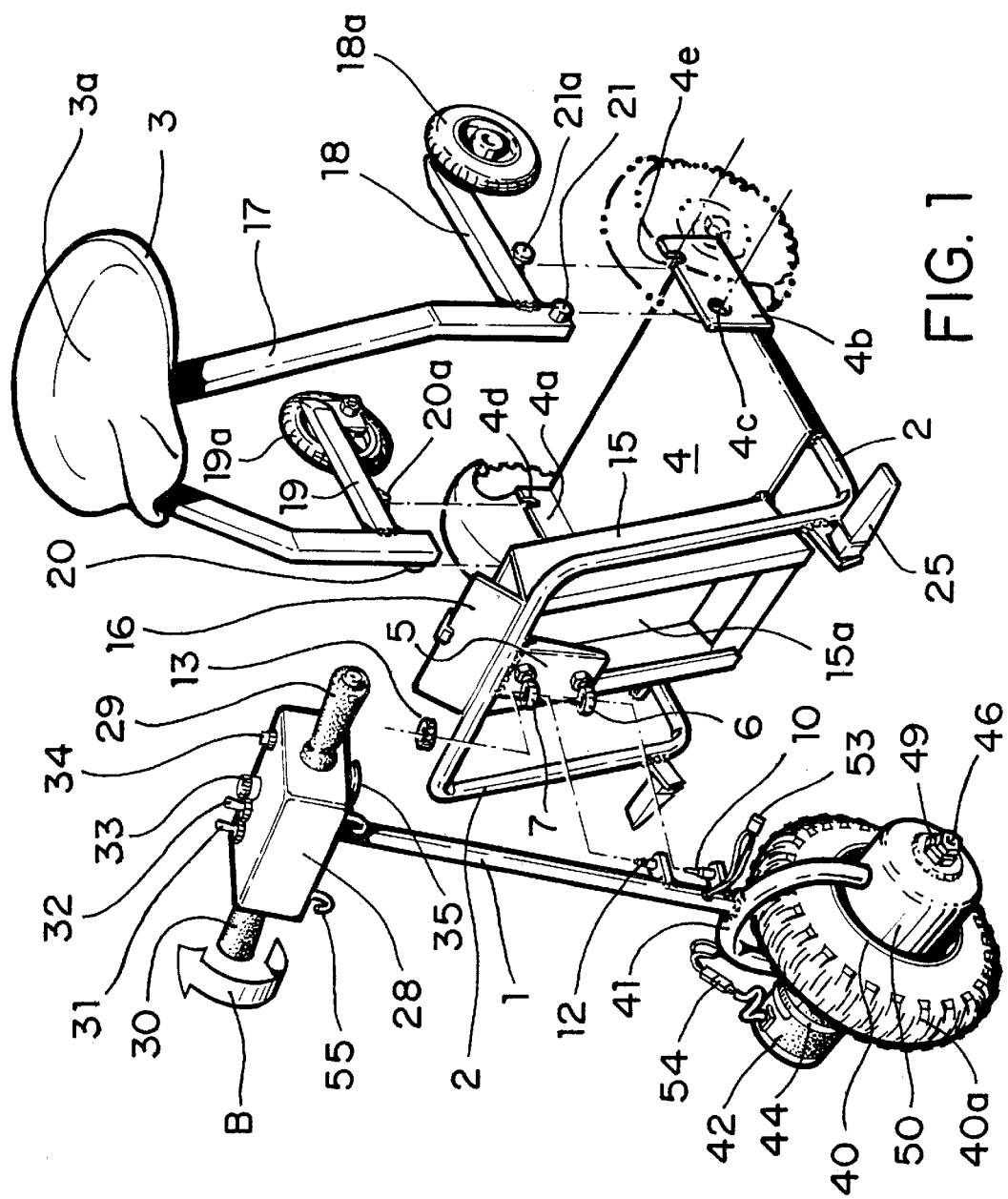
FIG. 1 is a perspective and exploded view of the overall scooter.
Figure 2:
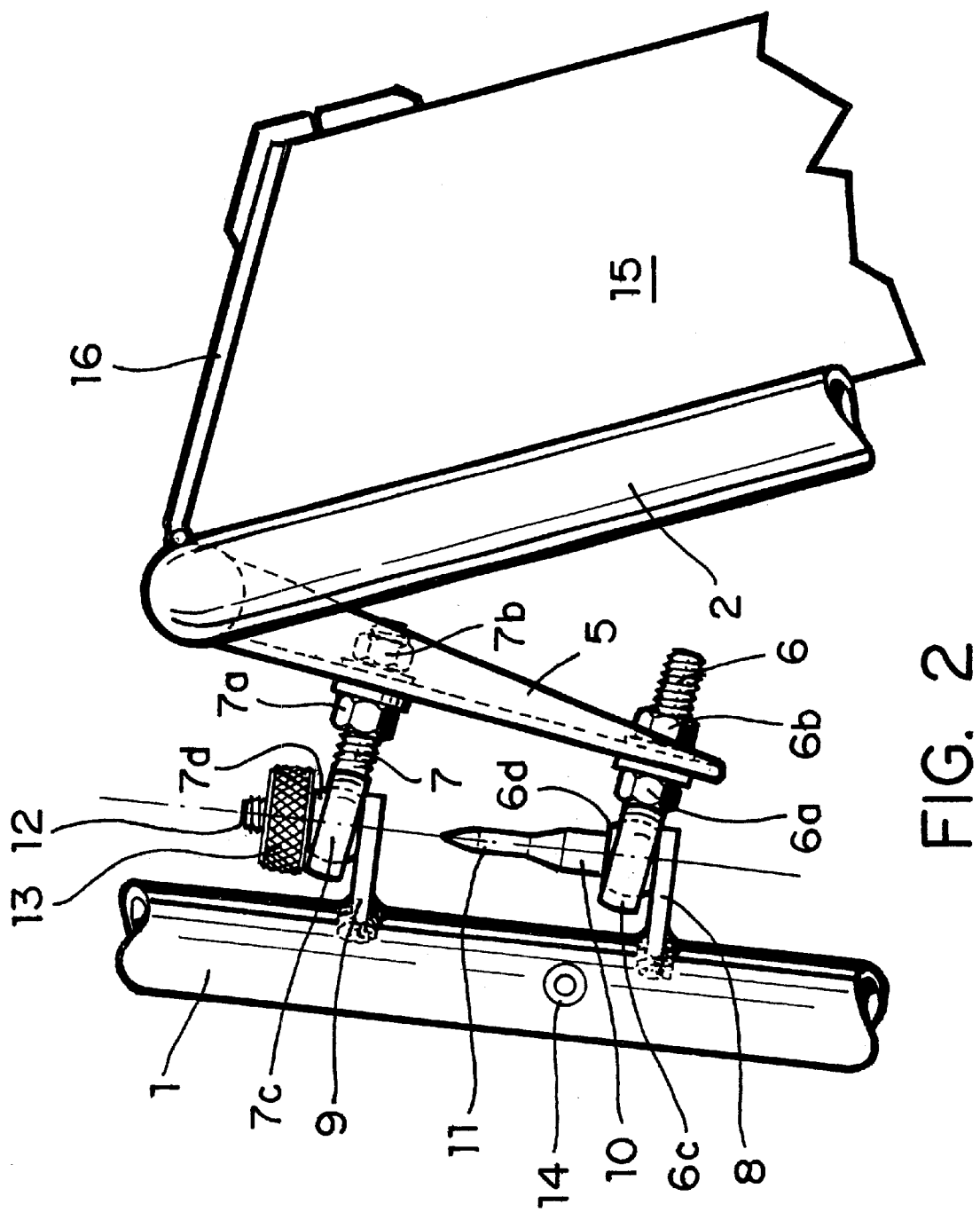
FIG. 2 shows the mounting of the steering column on the main frame of the scooter.

FIG. 1 shows the three basic components of the scooter in a perspective as well as in an exploded view. The three basic components consist of the steering column or tiller 1, the main frame 2 with the standup platform 4 and the seat assembly 3 with the seat 3a. Each of the three components will now be described in detail. With reference to FIGS. 1 and 2, there are shown the connecting parts that connect the steering column 1 to the main frame 2. To this end the main frame has a support plate 5 attached thereto at about its top midpoint. The support plate 5 has two eye bolts 6 and 7 attached thereto. The eye bolts 6 and 7 are adjustable relative to the support plate 5. This is accomplished by two nuts 6a and 6b on eye bolt 6 and two nuts 7a and 7b on eye bolt 7. It is clear now that once the bolts 6 and 7 are passed through the respective holes in the support plate 5, both bolts can be adjusted at different distances from the support plate 5 by threading the respective nuts 6a and 6b, respectively, 7a and 7b at different distances from the support plate 5. The relative positions will be explained below. The eyes 6c and 7c of the eye bolts 6 and 7, respectively, have gimbal bearings 6d and 7d received therein, which can tilt freely relative to their respective eye bolts. The steering support column 1 has two support tangs 8 and 9 attached thereto. The lower tang 8 has located thereon at the outer end a cylindrical mandrel 10, which is reduced at its upper end 11, which serves as a guide when the gimbal bearing 6d of eye bolt 6 is passed over the same. The upper support tang 9 has a threaded mandrel 12 located at its outer end. The lower part (not shown) of mandrel 12 is cylindrical to receive the gimbal bearing 7d of eye bolt 7 thereon, while the upper part of mandrel 12 is threaded to receive the lock nut or thumb nut 13 thereon to prevent the eye bolt 7 to escape from the mandrel 12 once it is received thereon.

The method of connecting the steering column 1 to the main frame 2 is as follows: One hand of a user will grasp the steering column 1 while the other hand grasps the main frame 2. It is merely up to the person, assembling the two components, to guide the gimbal bearing in eye bolt 6 over the reduced portion 11 of the mandrel 10 first, which acts as a pilot, and then to line up the other gimbal bearing in eye bolt 7 over the threaded mandrel 12 and thereafter to let both components drop into their respective positions. By applying the lock nut onto the threaded mandrel 12, the connection is now locked into place. It is noted that no tools are required to accomplish the above noted task.

Figure 3:
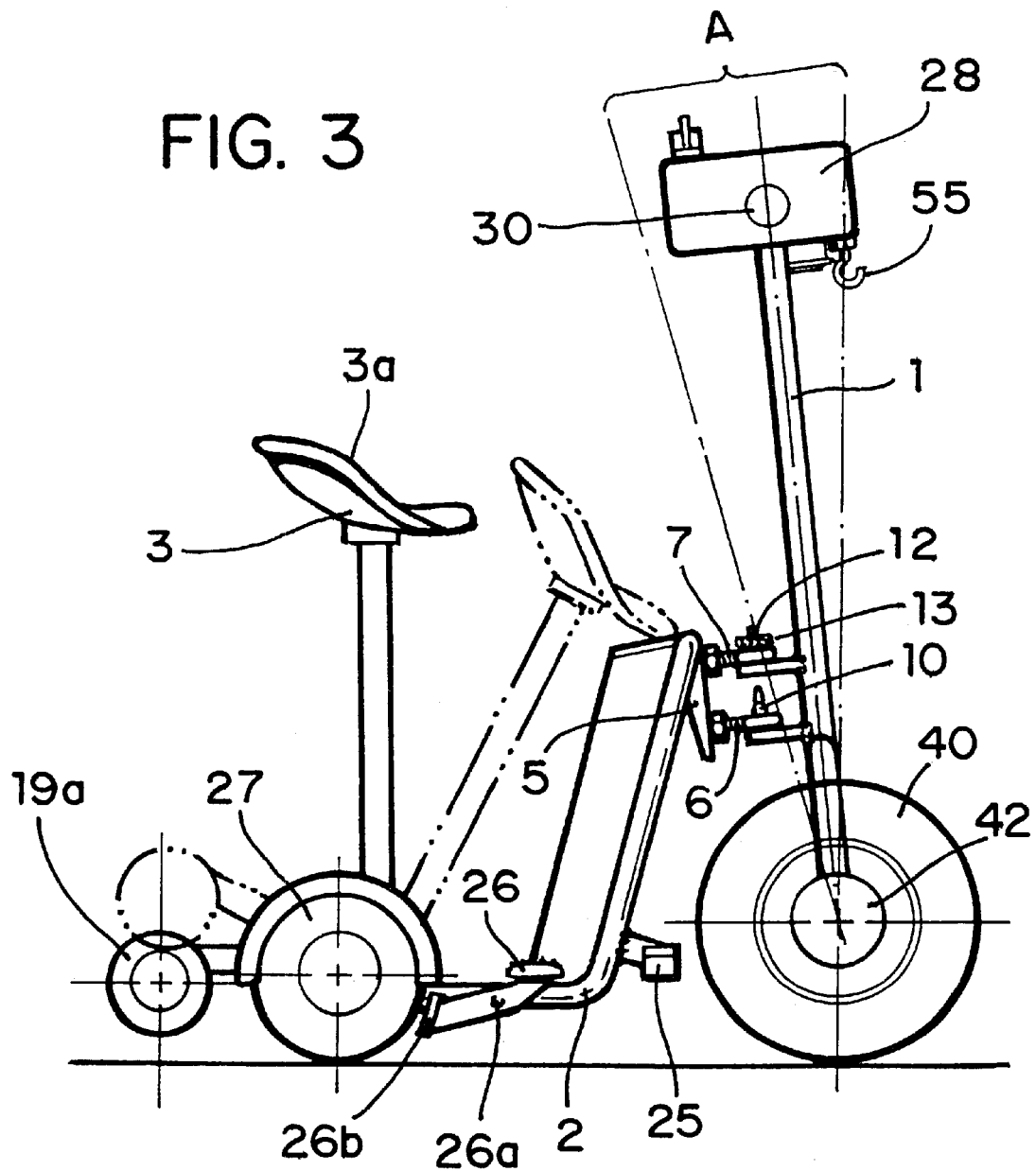
FIG. 3 illustrates the movable seat relative to the main frame.

The adjustability of the steering column 1 relative to the support plate 5 on the main frame 2 will now be explained. Once the connection between the steering column 1 and the main frame 2 via the support plate 5 has been made, the nuts 6a and 6b or the eye bolt 6 are loosened and so are the nuts 7a and 7b on the eye bolt 7. Both eye bolts 6 and 7 can now be moved in or out of the support plate 5. If the support column 1 should take on a more vertical position, the eye bolt 7 is moved farther out of the support plate 5 and the other or lower eye bolt 6 is moved farther in relative to the support plate 5, whereby the steering column will assume a more vertical position or orientation. The lock nuts 6a and 6b and the lock nuts 7a and 7b are now fastened. If an orientation away from the vertical is desired, the reverse adjustment would have to be made. In FIG. 3 there is shown, by way of example, an angle A to indicate the range of movement of the steering column. Still referring to FIG. 2, there is shown a rubber grommet 14 for passing the electric wiring there through. Also there is shown a battery box 15 including a battery receptacle 15a having a lid 16 thereon to protect the battery located therein from the elements. The two hooks 55 can be used for hanging a basket thereon.

Referring now to FIGS. 1 and 3, there is shown the movable seat assembly arrangement. The seat assembly 3 consists of a U-shaped seat frame 17 with the U being inverted whereby at the top of the U a seat 3a is attached. At each end of the U-shaped frame there is each a stabilizer bar 18 and 19 attached in a rigid configuration. At the other end of each stabilizer bar, wheels 18a and 19a, respectively, are attached which will be explained below. On the platform 4 on each side, there are two upstanding support plates 4a and 4b attached. On each of the support plates 4a and 4b there are two bearing places for the legs of the seat frame 17 provided. In the upstanding support plate 4b there is shown a hole 4c. There is also a hole in the other upstanding support plate 4a (not shown). The purpose of these holes is to receive the locking pegs 20 and 21 therein so that the frame assembly 17 can swing there around. When the frame assembly is to be installed in these holes, the two legs of the U-shape have to be squeezed together to be able to enter the holes 4c. Once the locking pegs 20 and 21 are received in the holes 4c, the squeeze of the U-shape can be relaxed and the locking pegs 20 and 21 will firmly lock between the two upstanding support plates 4a and 4b while still being able to rotate around the same. On each of the stabilizer bars 18 and 19 two stabilizer pins 20a and 21a are attached. When the seat frame 17 is rotated around the holes 4c (on each side) to a seating or an active position, both of the stabilizer pins 20a and 21a will seat in the recesses 4d and 4e in the upstanding plates 4a and 4b, respectively. This will assure a stable support for the seat assembly. The stabilizer wheels 18a and 19a are added so that the whole platform assembly may be stabilized when the person sitting on the seat leans back too far to thereby shift the weight too far past the rear wheels 27 to thereby upset the balanced weight of the seat assembly. When this happens the two wheels will touch ground to thereby remedy the above noted problem. It is now clear that the seat assembly disclosed can easily be converted to a person's standup or sitdown mode merely by swinging the seat assembly around the locking pegs 20 and 21 in their respective holes 4c. Further shown in FIGS. 1 and 3 are footrests 25. There is further shown a brake pedal 26 which pivots around the pivot pin 26a. When stepping on the brake pedal, the brake pad 26b will engage with one of the rear wheels 27. On top of the steering column 1 there is provided a console 28 which contains the various control devices to operate the scooter. Thus, there is a steering handle 29 and an accelerator handle 30 which, when rotated as shown by arrow B, controls the speed of the scooter through a rheostat contained in the console 28. On the console 28 there is further shown an off and on switch 31, a forward and reverse switch 32, a fuse 33 and a horn button 34 to activate the horn 35.

Figure 5:
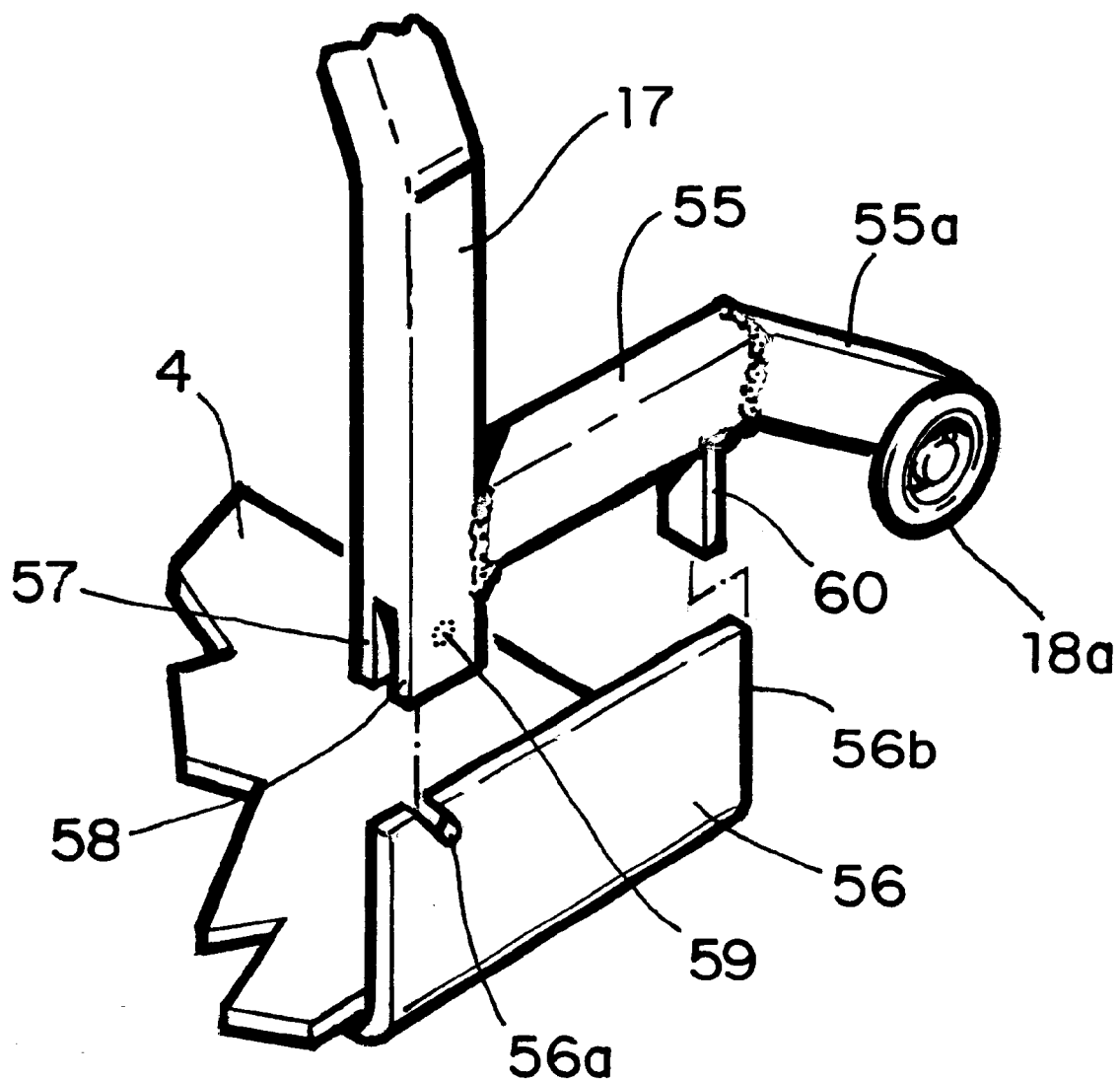
FIG. 5 shows a different way of accommodating a swinging movement of the seat assembly.

Another embodiment of attaching the seat assembly on the platform 4 and to accommodate the same for a swinging movement is shown in FIG. 5. This alternative embodiment includes the platform 4 and the seat frame 17 depending from the seat assembly. At the lower end of the seat frame 17 are located two depending plates 57 and 58 which are either integral with the leg structure of the seat frame 17 or welded thereto. The space between the plates is traversed by a pin 59. On the platform 4 again an upstanding plate 56 has been provided which has a forward slot 56a provided thereon which slot has a rearward inclination of about 45°. There is a stabilizing bar 55 attached to the seat frame 17 in a horizontal manner. However the rear end 55a of the horizontal bar is rearwardly inclined from the horizontal. This inclination allows for the attachment of a much smaller stabilizing wheel 18a of about the size of an in-line skate wheel. This alone reduces the size and the weight of the seat assembly. Also on the horizontal bar 55, a downwardly depending plate 60 is attached for the purpose of stabilizing the horizontal bar 55 once it is attached to the platform 4. The attachment is as follows: The seat assembly is taken in both hands by a user and placed over the platform 4. Of course, there are two depending legs on each side of the seat assembly. By slightly tilting the seat assembly forward, the traversing pin 59 between the plates 57 and 58 can now enter the rearwardly inclined slot 56a until it seats in the bottom thereof. Thereafter, the horizontal stabilizer bar will rest on the upstanding plate 56 and the depending plate or stop 60 will slip behind the edge 56b of the plate 56 and thereafter will prevent any forward movement of the seat assembly in a fully stabilized manner.

Figure 4:
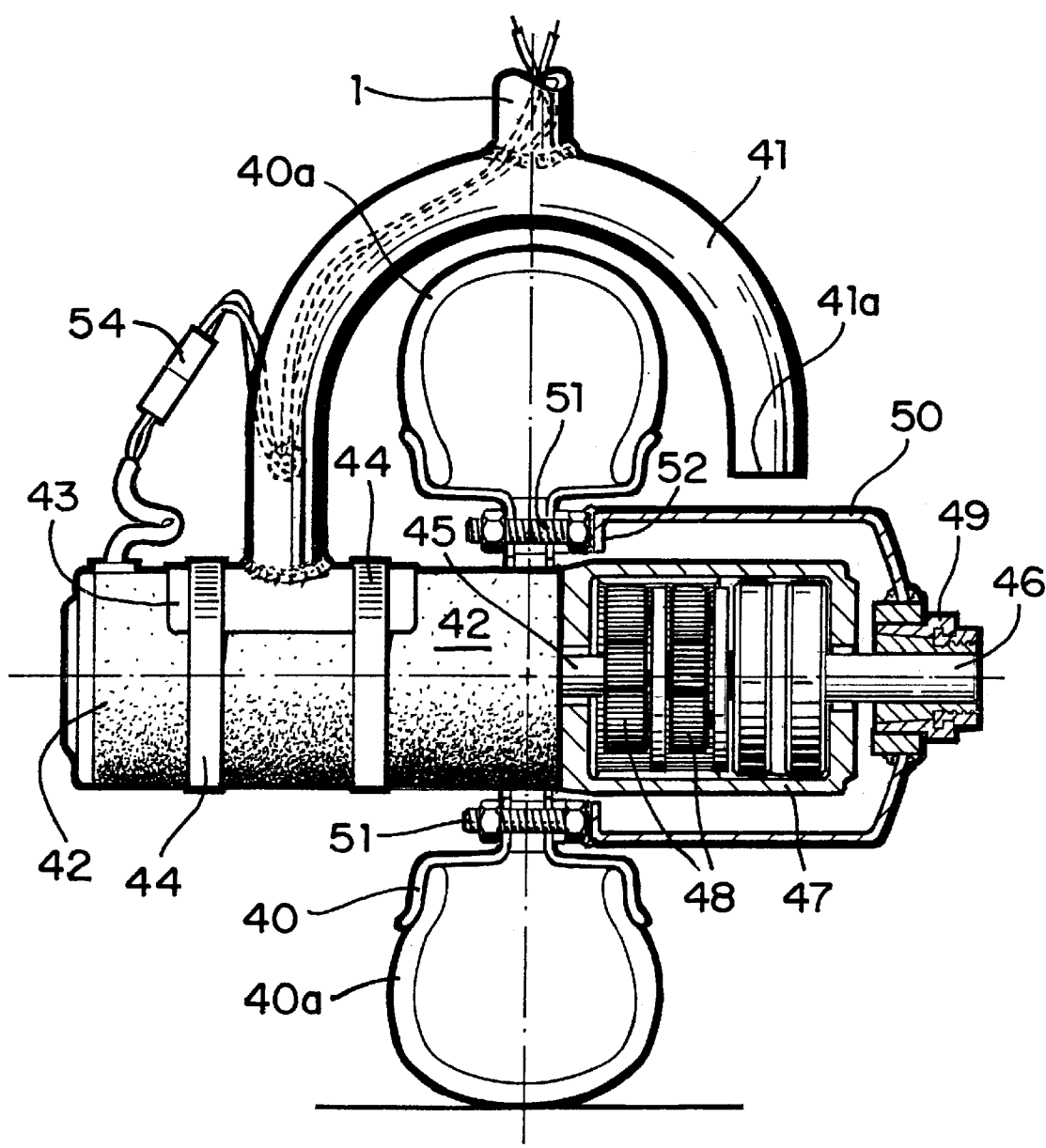
FIG. 4 is a cross section through the front wheel planetary gear drive.

Turning now to FIGS. 1 and 4, there is shown on the lower section of the steering column a front wheel 40, having a pneumatic tire 40a mounted thereon, which is mounted by way of a yoke 41. The yoke 41 in turn is attached to the lower end of the steering column 1 by way of a weld. The yoke 41 is mounted to the electric motor 42 by way of a flange plate 43 which is curved to match the outer contour of the circular housing of the electric motor 42. The flange plate 43 in turn is fastened to the motor 42 by way of two hose clamps 44. This way the yoke 41 is rigidly and securely fastened to the electric motor 42. It is noted that the other end of the yoke at 41a is free of any other connection in the front wheel drive. The front wheel itself is driven by a planetary gear drive which is contained in the housing 47 which is attached to the motor housing 42 and, therefore, does not rotate. The motor shaft 45 drives the speed reduction planetary gearing 48 which in turn drives the shaft 46 at a reduced speed when compared to the speed of the motor shaft 45. This type of gearing is well known. What is not known is how the wheel 40 is now driven from the reduction gear shaft 46 according to the invention. To this end, a keyless bushing 49 is fastened to the gear shaft 46. A keyless bushing consists of three parts: an inner cylindrical and slotted wedge-shaped part is inserted into an outer cylindrical and slotted wedge-shaped part. The two wedge-shaped parts are pulled into each other by a nut on the inner part whereby both parts will expand at the same time. In the application at hand, the inner part will wedge against the shaft 46 passing there through while the outer part will wedge against the inner circumference of an opening in a bell-shaped housing 50. The keyless bushing has not been shown because it is well known in the art. The housing 50 is welded to the bushing at its bell section while the open end of the bell is fastened to wheel 40 by bolts 51 which are welded to the inturned flange 52. In case the flange 52 is an outturned flange, the bolts 51 may pass directly through the flange and into the wheel 40. FIG. 4 further shows the electric wire connections 54 as the wires pass through the steering column 1 into the electric motor 42. FIG. 1 further shows the electric leads 53 as they lead to the battery (not shown) contained in the battery housing 15. It is preferred that all three tires be of a pneumatic construction for a smoother ride. The front tire 40a, being the driving tire, is of a size 4.10/3.50–6 size. The two rear tires are of 2.50–4 size, although other tire sizes for all three tires may used.

I claim:

1. A three wheel electric scooter comprising a single wheel front wheel drive mounted at a bottom of a steering column, a platform supported by two rear wheels, means for movably connecting said platform to said steering column, a seat assembly mounted on said platform and including a seat, and means on said platform for accommodating a swinging movement of said seat assembly from an active position for a person to sit on said seat of said seat assembly to an inactive and out of the way position so that a person can stand on said platform, said seat assembly includes an inverted U-shaped frame, a top of said U-shaped frame having said seat attached thereto, each of the legs of said U-shaped frame having a stabilizer bar rigidly attached thereto and each of the legs has a peg thereon for rotationally attaching each of the legs to support plates on said platform.

2. The electric scooter of claim 1, wherein said means for movably connecting said platform to said steering column includes means for adjusting said steering column to various positions relative to a vertical line.

3. The electric scooter of claim 2, wherein said means for adjusting includes two mandrels attached to said steering column and eye bolts attached to said platform, each of said gimbal bearings is received over one of said mandrels.

4. The electric scooter of claim 3 including means on at least one of the mandrels for locking the respective gimbal bearing on said at least one mandrel.

5. The electric scooter of claim 1, wherein said front wheel drive includes gearing for driving a front wheel.

6. The electric scooter of claim 5, wherein said gearing for driving is a speed reduction planetary gearing.

7. A three wheel electric scooter comprising a single wheel front wheel drive mounted at a bottom of a steering column, a platform supported by two rear wheels, means for movably connecting said platform to said steering column, a seat assembly mounted on said platform and including a seat, and means on said platform for accommodating a swinging movement of said seat assembly from an active position for a person to sit on said seat of said seat assembly to an inactive and out of the way position so that a person can stand on said platform, wherein said seat assembly includes an inverted U-shaped frame, a top of said U-shaped frame having said seat attached thereto, each of the legs of said U-shaped frame having at their bottom thereof two spaced apart plates depending therefrom, a traversing pin is located between said depending plates on each leg, each of the legs of said U-shaped frame having a horizontal stabilizing bar attached at their bottom thereof, each rear end of said horizontal stabilizer bars has a downwardly inclined extension and a plate is attached to each of said horizontal stabilizer bars extending downwardly, two upstanding support plates are attached on opposite sides of said platform, each of said upstanding plates has at a forward end thereof a rearwardly inclined slot provided therein, whereby when said traversing pins enter said inclined slots and seat in a bottom thereof, each of said downwardly extending plates on said horizontal stabilizer bars will slip behind an edge of one of said upstanding plates to prevent any forward movement of said seat assembly.

8. An electric scooter having a single front wheel drive, wherein said front wheel drive is driven by an electric motor having a driven shaft, said driven shaft is connected to a speed reducing planetary gearing having a driven output shaft, a bell shaped housing having an open mouth end and a closed end is rigidly attached to said output shaft at its closed end and rotates therewith, said open mouth end is rigidly attached to a front wheel to drive said front wheel.

* * * * *